US006794923B2

(12) United States Patent
Burt et al.

(10) Patent No.: US 6,794,923 B2
(45) Date of Patent: Sep. 21, 2004

(54) LOW RIPPLE CHARGE PUMP FOR CHARGING PARASITIC CAPACITANCES

(75) Inventors: Rodney T. Burt, Tucson, AZ (US); Haoran Zhang, Tucson, AZ (US); Thomas L. Botker, Tucson, AZ (US); Vadium V. Ivanov, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/233,966

(22) Filed: Sep. 3, 2002

(65) Prior Publication Data

US 2003/0179593 A1 Sep. 25, 2003

Related U.S. Application Data

(60) Provisional application No. 60/365,905, filed on Mar. 20, 2002.

(51) Int. Cl.[7] .............................................. H03K 17/16
(52) U.S. Cl. ........................ 327/382; 327/384; 327/536
(58) Field of Search ................................ 327/382, 384, 327/536, 434, 147, 148, 156, 157, 427, 144; 363/59, 60

(56) References Cited

U.S. PATENT DOCUMENTS

| 5,590,076 | A | * | 12/1996 | Haddad et al. ........ 365/185.25 |
| 5,717,581 | A | | 2/1998 | Canclini |
| 5,973,944 | A | | 10/1999 | Nork |
| 6,052,015 | A | * | 4/2000 | Desbonnets ................. 327/382 |

OTHER PUBLICATIONS

Maxim Integrated Products, MAX679, "Regulated 3.3V Charge Pump," Apr. 1997, Technical Data Sheet, pp1–6.
Bayer, Erich and Schmeller, Hans, "Tomorrows Charge Pumps—Today," Apr.–Jun. 2000, European Technology, TI Technical Journal, Technical Paper, pp 1–8.
Maxim Integrated Products, MAX1747, "Triple Charge–Pump TFT LCD DC–DC Converter," Oct. 2000, Technical Data Sheet, pp 1–13.
Texas Instruments, "50mA Switched–Cap Dc/Dc Converter," Feb. 2001, Technical Data, pp 1–8.
Texas Instruments, "TPS6010x/TPS6011x Charge Pump," May 22, 2001, Application Report Abstract http://www.ti.com/sc/docs/psheets/abstracts/apps/slva070a.htm.
Maxim, "Properties of the Charge–Pump Voltage Splitter," May 22, 2001, Technical Data, pp 1–6 http://dbserv.maxim-ic.com/tarticle/view.

* cited by examiner

*Primary Examiner*—Shawn Riley
(74) *Attorney, Agent, or Firm*—W. Daniel Swayze, Jr.; W. James Brady; Frederick J. Telecky, Jr.

(57) ABSTRACT

A charge pump circuit is configured for charging of parasitic capacitances associated with charge pump capacitors in a manner that minimizes voltage ripple. The charge pump circuit is suitably configured with an independent charging circuit configured for supplying the current needed to charge the parasitic capacitances, rather than utilizing the reservoir capacitor to supply the needed current. The independent charging circuit can be implemented with various configurations of charge pump circuits, such as single phase or dual phase charge pumps, and/or doubler, tripler or inverter configurations. The independent charging circuit includes a parasitic charging capacitor or other voltage source configured with one or more switch devices configured to facilitate charging of the parasitics during any phases of operation of the charge pump circuit. In addition, the independent charging circuit includes an independent cell, and is local to charge pump circuit for supplying the current for charging the parasitic capacitances, instead of having the current supplied through external bussing or wire bonds.

14 Claims, 5 Drawing Sheets

LOW RIPPLE CHARGE PUMP FOR CHARGING PARASITIC CAPACITANCES

CROSS-REFERENCE TO RELATED APPLICATIONS

This application claims priority of U.S. Provisional Application Serial No. 60/365,905, filed Mar. 20, 2002, entitled "CHARGE PUMPS WITH CONTROLLED CHARGE CURRENT."

FIELD OF INVENTION

The present invention relates to charge pumps for use in integrated circuits. More particularly, the present invention relates to a charge pump having a low voltage ripple.

BACKGROUND OF THE INVENTION

The demand for less expensive, and yet more reliable integrated circuit components for use in communication, imaging and high-quality video applications continues to increase rapidly. As a result, integrated circuit manufacturers are requiring improved performance in the voltage supplies and references for such components and devices to meet the design requirements of such emerging applications.

Figure 1:
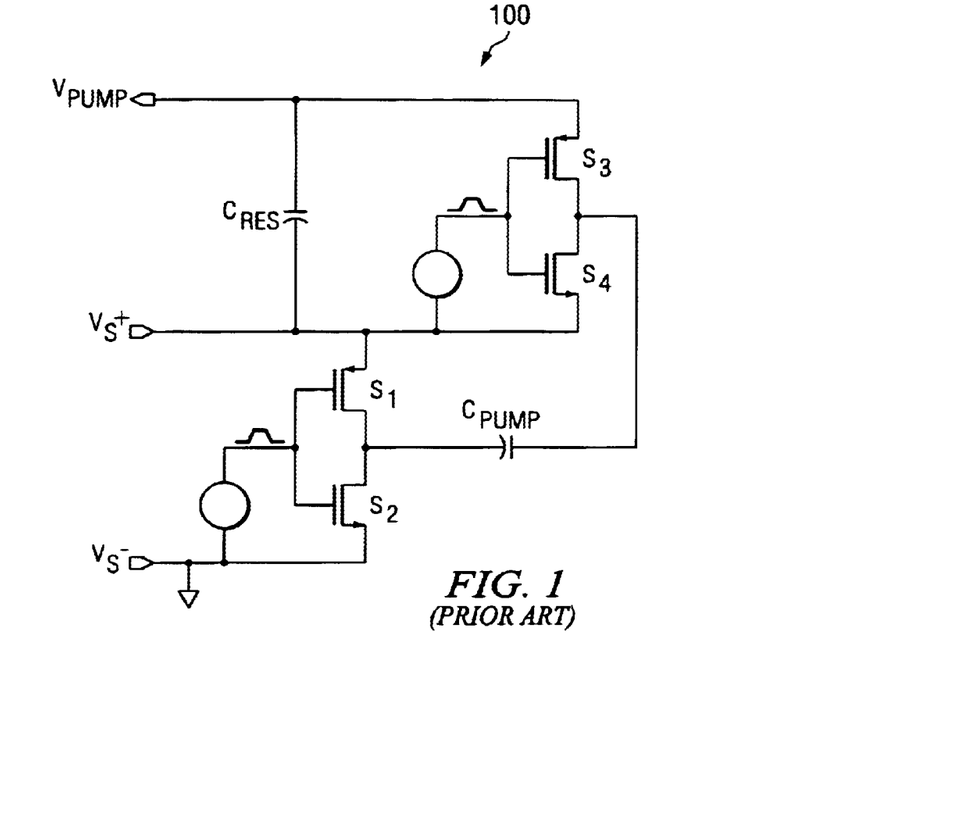
FIG. 1 illustrates a schematic diagram of a prior art charge pump doubler circuit.

One device utilized for providing a regulated voltage supply is a charge pump circuit. Charge pumps are DC/DC converters that utilize a capacitor instead of an inductor or transformer for energy storage, and are configured for generating positive or negative voltages from the input voltage. Charge pumps can be configured in various manners, including a charge pump voltage doubler circuit, i.e., a charge pump circuit configured for doubling the input voltage, as well as tripler and inverter configurations. Charge pump circuits can be configured for single phase operation, with a single charge pump capacitor used to charge current during one phase of operation and discharge current during another phase of operation. For example, with reference to FIG. 1, a basic charge pump doubler 100 is illustrated, having a pump capacitor $C_{PUMP}$, as well as switches $S_1$, $S_2$, $S_3$ and $S_4$ that are configured for single phase operation. In addition, charge pump circuit 100 comprises a reservoir capacitor $C_{RES}$ for maintaining charge to a load device. Basic charge pump doublers exhibit undesirable output voltage ripple due to uncontrolled inrush and charging currents, among other reasons.

Figure 2:
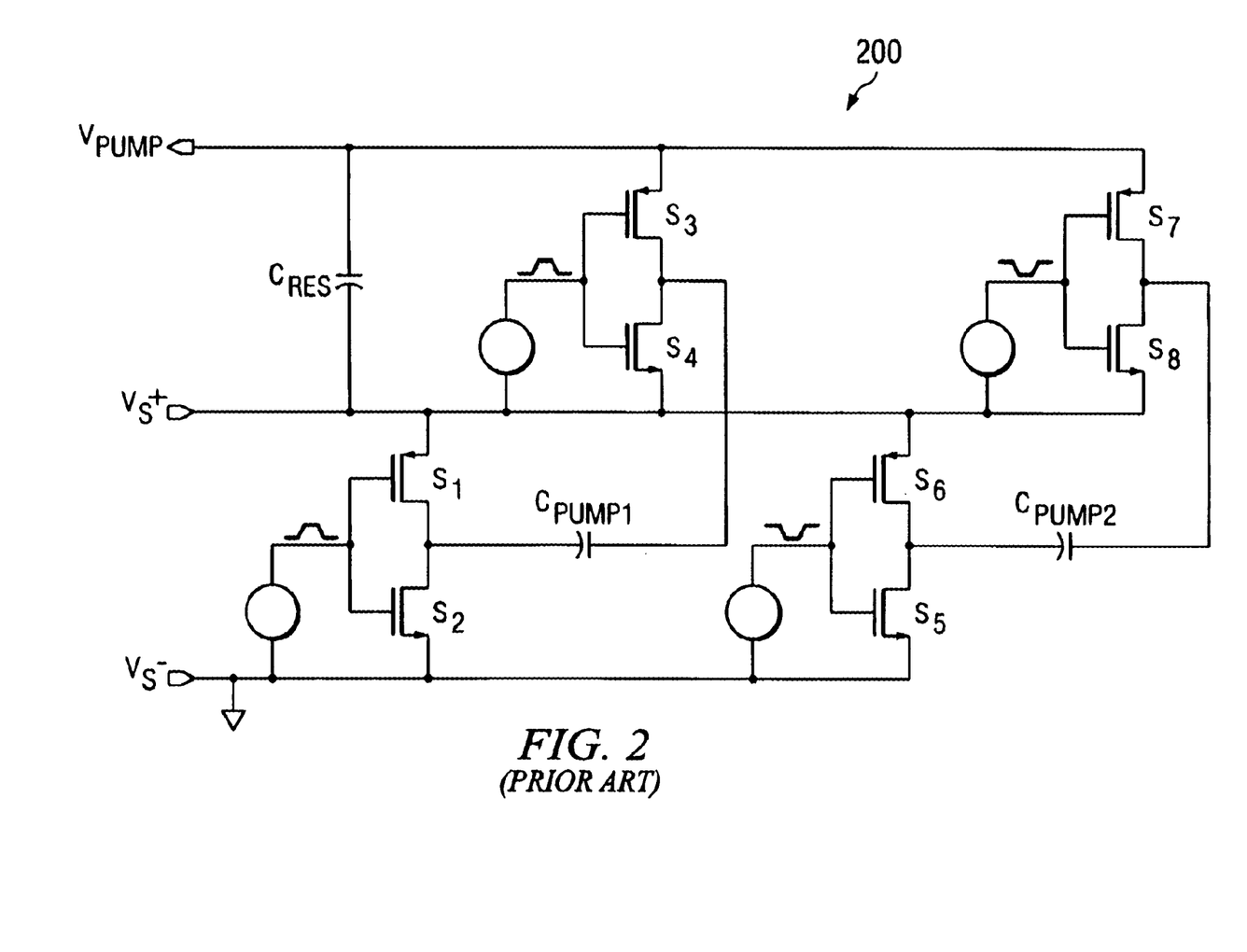
FIG. 2 illustrates a schematic diagram of a prior art dual phase charge pump doubler circuit.

To improve voltage ripple, charge pump circuits can also be configured for dual phase regulation, in which two charge pump capacitors are configured to operate during both phases of operation, i.e., one of the capacitors is charging current and the other capacitor is discharging current during each phase of operation. For example, with reference to FIG. 2, a charge pump circuit 200 configured for dual phase voltage operation is illustrated. Charge pump circuit 200 includes a charge pump control circuit comprising four switches $S_1$, $S_2$, $S_3$ and $S_4$ for use with a first pump capacitor $C_{PUMP1}$ configured to discharge and supply current to a load device during a first phase while a second pump capacitor $C_{PUMP2}$ is being charged, and four switches $S_5$, $S_6$, $S_7$ and $S_8$ for use with second pump capacitor $C_{PUMP2}$ configured to discharge and supply current to the load device during a second phase while first pump capacitor $C_{PUMP1}$ is being charged.

Other approaches to charge pump circuits include the implementation of a latch triggered upper switch drive. For example, with reference to FIG. 3, a charge pump circuit 300 configured as a dual phase doubler comprises a latch triggered upper drive 360 for driving upper switches $S_3$, $S_4$ and $S_7$, $S_8$ in phase with lower switches $S_1$, $S_2$, and $S_5$, $S_6$, wherein nodes 310 and 320 are pulled down to ground on one cycle and up to supply voltage $V_S^+$ during the second cycle. Such dual phase charge pump doublers as 200 and 300 have improved output voltage ripple as compared to single phase doublers, but still have significant ripple due to current drawn by charge pump capacitors $C_{PUMP1}$ and $C_{PUMP2}$, as well as reservoir capacitor $C_{RES}$.

Another approach to improve ripple performance includes the use of regulated charge pump circuits having a regulation loop. For example, a dual phase charge pump regulator can comprise a latch triggered upper drive and a regulation loop comprising a regulated voltage $V_{REG}$ and an amplifier. The amplifier is configured to sense the difference in voltage from pump voltage $V_{PUMP}$ and supply voltage $V_S^+$, i.e., a difference voltage $V_{REG}$, to regulate charging of the pump capacitors. Thus, for example, through operation of the regulated feedback loop of the amplifier, a regulated voltage $V_{REG}$, e.g., 2 volts, is forced between pump voltage $V_{PUMP}$ and supply voltage $V_S^+$. Accordingly, regulated charge pump circuits can regulate not only DC, but also during the discharge phase from which ripple occurs.

Figure 3:
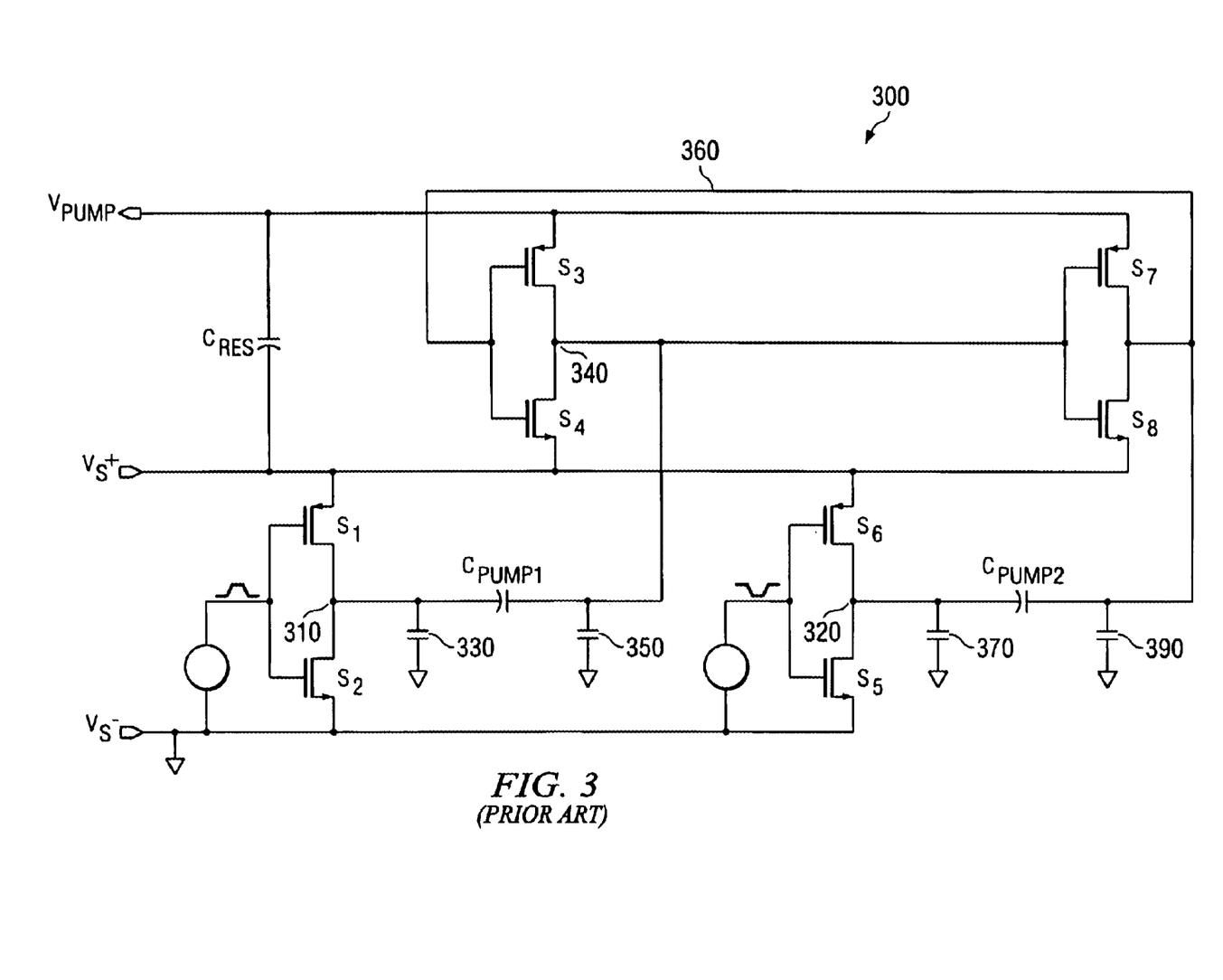
FIG. 3 illustrates a schematic diagram of a prior art dual phase charge pump doubler circuit with a latch triggered upper switch drive.

One problem inherent in any charge pump circuit is the presence of parasitics on the pump capacitors. For example, for charge pump circuit 300, charge pump capacitors $C_{PUMP1}$ and $C_{PUMP2}$ include parasitic capacitors 330 and 350 and parasitic capacitors 370 and 390, respectively. Parasitic capacitors 330, 350, 370 and 390 can often have a capacitance between approximately 1% to 10% or more of the capacitance of charge pump capacitors $C_{PUMP1}$ and $C_{PUMP2}$, e.g., for 50 pF of capacitance for pump capacitors $C_{PUMP1}$ and $C_{PUMP2}$, parasitic capacitors 330, 350, 370 and 390 can comprise approximately 0.5 pF to 5 pF of capacitance. During the phase changes, which occur very rapidly, parasitic capacitors 330, 350, 370 and 390 must also be charged in a very short amount of time. Even with the addition of an amplifier and a regulator loop that is capable of supplying small currents, such a regulator loop will not sufficiently respond to fast transient requirements.

Thus, reservoir capacitor $C_{RES}$ must supply the glitch current, e.g., up to 4 mA or more, required to recharge parasitic capacitors 330, 350, 370 and 390. However, when reservoir capacitor $C_{RES}$ supplies the glitch current di/dt, a voltage drop of up to approximately 150 mV or more can occur at the output of charge pump circuit 300, resulting in undesirable voltage ripple.

Accordingly, a need exists for an improved charge pump regulator that can suitably charge the parasitics of the charge pump capacitors, thus improving voltage ripple performance.

SUMMARY OF THE INVENTION

A charge pump circuit is configured for charging of parasitic capacitances associated with charge pump capacitors in a manner that minimizes voltage ripple. In accordance with one aspect of the present invention, the charge pump circuit is suitably configured with an independent charging circuit configured for supplying the current needed to charge the parasitic capacitances, rather than utilizing the reservoir capacitor to supply the needed current. As a result, the total voltage ripple can be reduced, e.g., by a factor of up to ten times or more, during operation of the charge pump circuit. The independent charging circuit can be implemented with various configurations of charge pump circuits, such as single phase or dual phase charge pumps, and/or doubler, tripler or inverter configurations.

The independent charging circuit is configured to minimize introduction of noise to charge pump circuit. In accordance with an exemplary embodiment of the present invention, the independent charging circuit is local to the charge pump circuit for supplying the current for charging the parasitic capacitances, instead of having the current supplied through external bussing or wire bonds.

The independent charging circuit can be configured in various manners for supplying the current required for charging the parasitic capacitances. In accordance with an exemplary embodiment comprising a dual phase charge pump doubler, the independent charging circuit comprises a parasitic charging capacitor configured with a pair of switch devices configured to facilitate charging of the parasitics during both phases of operation of dual phase charge pump circuit. However, the independent charging circuit can comprise any voltage source for providing a charge, as well as fewer or additional switch devices based on the number of pump capacitors.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The present invention may be described herein in terms of various functional components. It should be appreciated that such functional components may be realized by any number of hardware or structural devices configured to perform the specified functions. For example, the present invention may employ various integrated components, e.g., buffers, supply rail references, current mirrors, logic devices and the like, which are comprised of various electrical devices, e.g., resistors, transistors, capacitors, diodes and the like whose values may be suitably configured for various intended purposes. In addition, the present invention may be practiced in any integrated circuit application where regulated voltage supplies are desired. However for purposes of illustration only, exemplary embodiments of the present invention will be described herein in connection with a dual phase charge pump circuit. Further, it should be noted that while various components may be suitably coupled or connected to other components within exemplary circuits, such connections and couplings can be realized either by direct connection between components, or by connection through other components and devices located therein between.

As discussed above, previous approaches for solving the problems of charge pump circuits have difficulty in limiting ripple performance due to the glitch current di/dt required to charge the parasistics of the pump capacitors. However, in accordance with various aspects of the present invention, a charge pump circuit is configured for charging of parasitic capacitances associated with charge pump capacitors in a manner that minimizes voltage ripple. In accordance with one aspect of the present invention, the charge pump circuit is suitably configured with an independent charging circuit configured for supplying the current needed to charge the parasitic capacitances, rather than utilizing the reservoir capacitor to supply the needed current. As a result, the total voltage ripple can be reduced, e.g., by a factor of up to ten times or more, during operation of the charge pump circuit.

Figure 4:
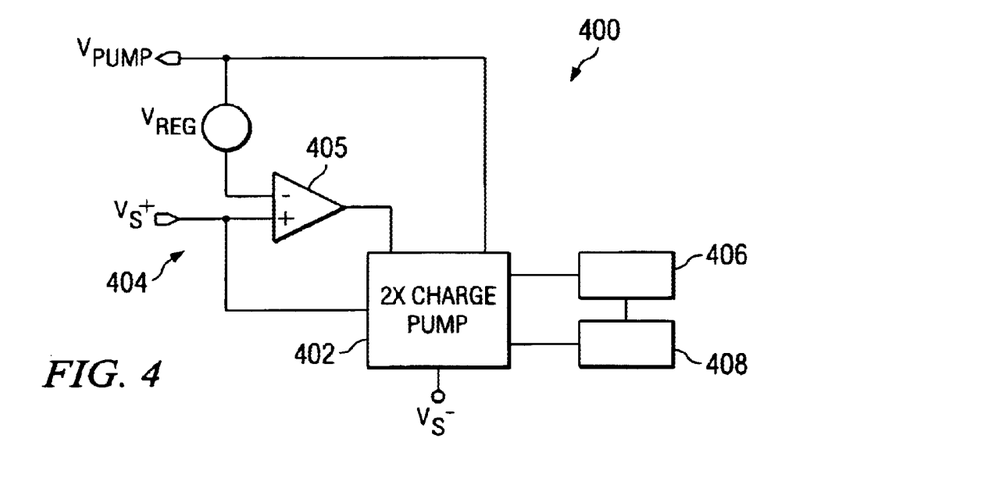
FIG. 4 illustrates a block diagram of an exemplary charge pump circuit with an independent charging circuit in accordance with an exemplary embodiment of the present invention.

In accordance with an exemplary embodiment, a block diagram of an exemplary charge pump circuit 400 is illustrated in FIG. 4. Charge pump circuit 400 comprises a charge pump doubler 402, a regulation loop 404, and an independent charging circuit 406. Charge pump doubler 402 comprises a dual phase charge pump, and can be configured with a clock signal for driving both lower and upper switches, such as provided through a clock circuit 408, or a latched triggered drive for the upper switches. However, charge pump doubler 402 can also be replaced by a single phase charge pump, as well as a tripler or an inverter configuration.

Regulation loop 404 comprises an amplifier 405 and is configured to sense the difference in voltages $V_S^+$ and $V_{PUMP}$, voltage difference $V_{REG}$, to regulate the charging of the pump capacitors. Amplifier 405 can be configured to provide a voltage output or a current output. During operation, regulation loop 404 is configured to provide regulation of the slower requirements for charging current within charge pump circuit 400, i.e., to drive the pump capacitors, but not the parasitic capacitances.

Independent charging circuit 406 is configured for supplying the current for charging parasitic capacitances during discharging of the pump capacitors, for example, during an initial phase of the discharging of the pump capacitors. In accordance with an exemplary embodiment, independent charging circuit 406 is local to charge pump circuit 400 for supplying the current for charging the parasitic capacitances, instead of having the current supplied through external bussing or wire bonds, or through reservoir capacitor $C_{RES}$. In addition, independent charging circuit 406 can also comprise an independent cell, enabling independent charging circuit 406 to be suitably "tacked on" to various charge pump circuit configurations. Operation of independent charging circuit 406 can be facilitated through clock circuit 408, which can comprise various logic configurations for providing controlled clock signals.

Independent charging circuit 406 is configured to address the high speed inaccuracies caused by glitch current requirements by suitably recharging the parasitic capacitances. Thus, rather than utilizing the reservoir capacitor to supply the needed current, the current required for charging parasitic capacitances during charging of the pump capacitors can be supplied by independent charging circuit 406. Accordingly, the total voltage ripple can be significantly reduced.

Figure 5:
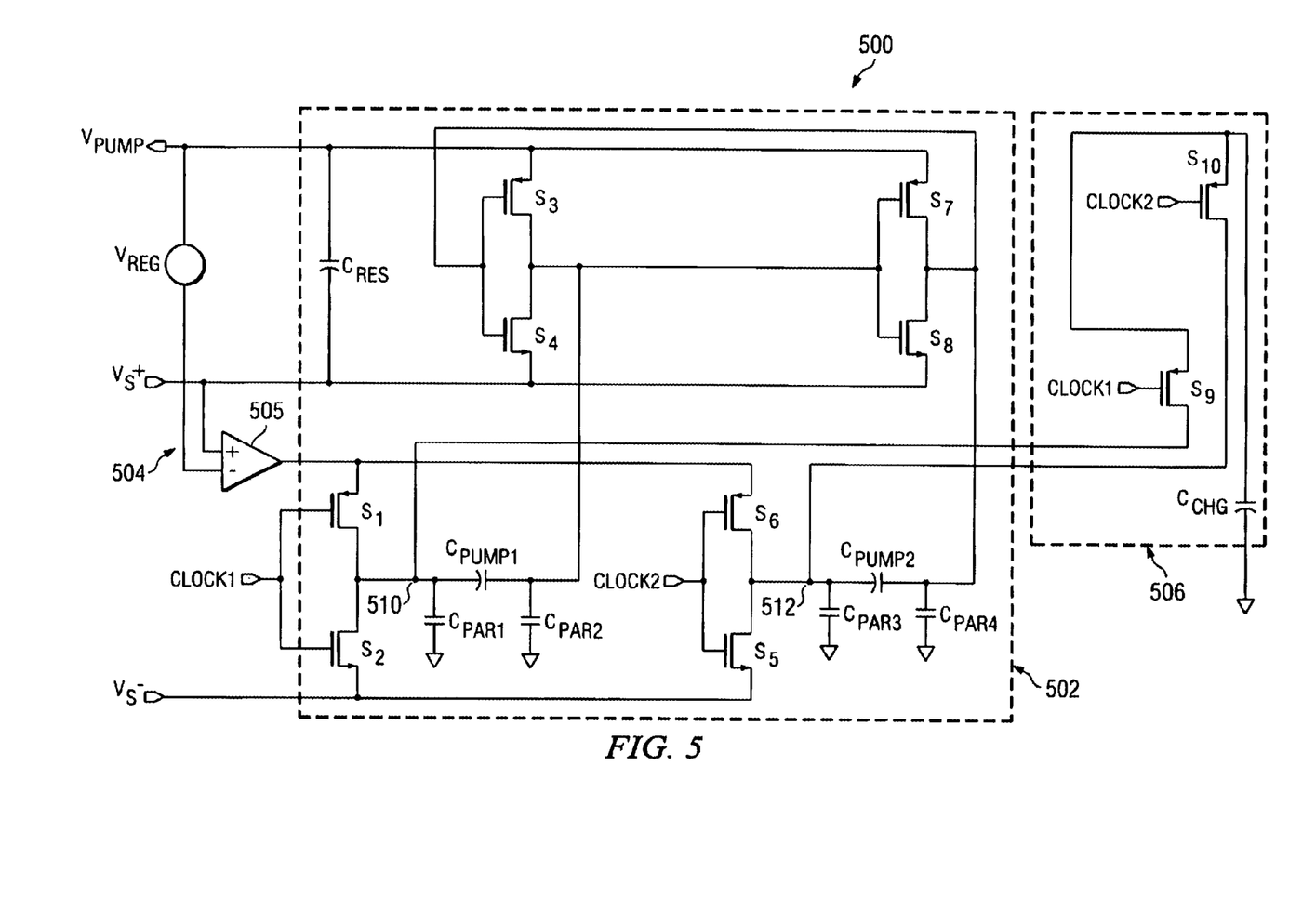
FIG. 5 illustrates a schematic diagram of an exemplary charge pump circuit with an independent charging circuit in accordance with an exemplary embodiment of the present invention.

With reference to FIG. 5, in accordance with an exemplary embodiment of the present invention, a schematic diagram of an exemplary charge pump circuit 500 is illustrated. Charge pump circuit 500 comprises a dual phase charge pump doubler 502 configured with a regulation loop 504 and an independent charging circuit 506. In accordance with this embodiment, dual phase charge pump doubler 502 comprises four switches $S_5$, $S_6$, $S_7$ and $S_8$ and a second pump capacitor $C_{PUMP2}$ configured for supplying current to drive a load device, i.e., discharging, during a first phase, e.g., when CLOCK1 signal is high and CLOCK2 signal is low, four switches $S_1$, $S_2$, $S_3$ and $S_4$ and a first pump capacitor $C_{PUMP1}$ configured for supplying or discharging current to the load device during a second phase, e.g., when CLOCK2 signal is high and CLOCK1 signal is low, and a reservoir capacitor $C_{RES}$ for maintaining a substantially constant output voltage at the load device. Although switches $S_3$, $S_4$, $S_7$ and $S_8$ are latch triggered, i.e., the gates of switches $S_3$ and $S_4$ are driven by the drains of switches $S_7$ and $S_8$, while the gates of switches $S_7$ and $S_8$ are driven by the drains of switches $S_3$ and $S_4$, switches $S_3$, $S_4$, $S_7$ and $S_8$ can also be suitably driven by level-shifted clock signals in phase with CLOCK1 and CLOCK2.

Pump capacitors $C_{PUMP1}$ and $C_{PUMP2}$ include parasitic capacitances $C_{PAR1}$ and $C_{PAR2}$ and parasitic capacitances $C_{PAR3}$ and $CPAR_4$, respectively. Parasitic capacitances $C_{PAR1}$, $C_{PAR2}$, $C_{PAR3}$ and $C_{PAR4}$ can be configured with different capacitance values, for example, with parasitic capacitances $C_{PAR1}$ and $C_{PAR3}$ configured as the dominant parasitics, e.g., approximately 10% of the capacitance of pump capacitors $C_{PUMP1}$ and $C_{PUMP2}$, and parasitic capacitances $C_{PAR2}$ and $C_{PAR4}$ comprising smaller parasitics, e.g., approximately 1% of the capacitance of pump capacitors $C_{PUMP1}$ and $C_{PUMP2}$. Thus, for an exemplary embodiment of charge pump circuit 500 comprising pump capacitors $C_{PUMP1}$ and $C_{PUMP2}$ having capacitances of approximately 50 pF, parasitic capacitances $C_{PAR1}$ and $C_{PAR3}$ can have a capacitance of approximately 5 pF, while parasitic capacitances $C_{PAR2}$ and $C_{PAR4}$ can have a capacitance of approximately 0.5 pF. Further, selection of the dominant parasitic can be made based on the layout of the parasitics on the substrate, i.e., by selecting the parasitic on the side of pump capacitors $C_{PUMP1}$ and $C_{PUMP2}$ closest to the substrate.

Regulation loop 504 comprises an amplifier 505 and a regulated voltage $V_{REG}$, which comprises the difference voltage forced between pump voltage $V_{PUMP}$ and supply voltage $V_{SUPPLY}$. Amplifier 505 is configured to provide regulation of the slower requirements for charging current within charge pump circuit 500, regulating for example within approximately 3–5 MHz, or about 4 MHz of bandwidth, or about 125 nanoseconds for each phase. Amplifier 505 can be configured to provide a voltage output or a current output. Although regulation loop 504 is provided for regulation of slow speed inaccuracies, regulation loop 504 can be suitably modified or replaced by any circuit or device for addressing slow speed inaccuracies. As discussed above, for high speed inaccuracies caused by glitch current requirements of parasitic capacitances $C_{PAR1}$, $C_{PAR2}$, $CPAR_3$ and $C_{PAR4}$, regulation loop 504 is insufficient alone. However, independent charging circuit 506 is configured to address the high speed inaccuracies caused by glitch current requirements by suitably recharging parasitic capacitances $C_{PAR1}$, $C_{PAR2}$, $C_{PAR3}$ and $C_{PAR4}$, rather than requiring reservoir capacitor $C_{RES}$ to provide the glitch current.

Independent charging circuit 506 is configured local to charge pump circuit 500 for supplying the current for charging parasitic capacitances $C_{PAR1}$, $C_{PAR2}$, $C_{PAR3}$ and $C_{PAR4}$ during discharging of current by the respective pump capacitor, $C_{PUMP1}$ or $C_{PUMP2}$. Accordingly, the current for charging parasitic capacitances $C_{PAR1}$, $C_{PAR2}$, $C_{PAR3}$ and $C_{PAR4}$ can be locally supplied, rather from an external source through bussing or wire bonds that can introduce other sources of noise to charge pump circuit 500. In addition, independent charging circuit 506 can also comprise an independent cell, enabling independent charging circuit 506 to be suitably "tacked on" to various charge pump circuit configurations.

Independent charging circuit 506 is configured for supplying the current for charging parasitic capacitances $C_{PAR1}$, $C_{PAR2}$, $C_{PAR3}$ and $C_{PAR4}$ during the discharging of pump capacitors $C_{PUMP1}$ and $C_{PUMP2}$. For example, when charge pump doubler 502 operates to discharge pump capacitor $C_{PUMP1}$, independent charging circuit 506 suitably provides the charging current required by parasitic capacitances $C_{PAR1}$ and $C_{PAR2}$, for a period such as approximately 10 nanoseconds. Once parasitic capacitances $C_{PAR1}$ and $C_{PAR2}$ are suitably charged, regulation loop 504, in addition to supplying current needed for maintaining regulation node 510, suitably recharges independent charging circuit 506 for the remainder of the approximately 125 nanoseconds of the first phase to prepare for the next phase. For the next phase, once charge pump doubler 502 operates to discharge pump capacitor $C_{PUMP2}$, independent charging circuit 506 suitably provides the charging current required by parasitic capacitances $C_{PAR3}$ and $C_{PAR4}$, e.g., for approximately 10 nanoseconds. Once parasitic capacitances $C_{PAR3}$ and $C_{PAR4}$ are suitably charged during the initial phase of the discharge cycle of pump capacitor $C_{PUMP2}$, regulation loop 504 suitably recharges independent charging circuit 506 for the remainder of the approximately 125 nanoseconds of the second phase to prepare again for the next phase.

Accordingly, by suitably charging parasitic capacitances $C_{PAR1}$, $C_{PAR2}$, $C_{PAR3}$ and $C_{PAR4}$ with independent charging circuit 506, regulation loop 504 can suitably drive pump capacitors $C_{PUMP1}$ and $C_{PUMP2}$ without requiring reservoir capacitor $C_{RES}$ to provide additional charge for the parasitics.

Independent charging circuit 506 can be configured in various manners for providing a charging current for parasitic capacitances $C_{PAR1}$, $C_{PAR2}$, $C_{PAR3}$ and $C_{PAR4}$. In accordance with an exemplary embodiment, independent charging circuit 506 comprises a parasitic charging capacitor $C_{CHG}$ configured with a pair of switch devices $S_9$ and $S_{10}$ to facilitate charging of the parasitics during both phases of operation of dual phase charge pump circuit 500.

Switch devices $S_9$ and $S_{10}$ can be controlled by clock signals CLOCK1 and CLOCK2, or by other clock signals configured to facilitate charging of parasitic capacitances $C_{PAR1}$, $C_{PAR2}$, $C_{PAR3}$ and $C_{PAR4}$ during discharging of pump capacitors $C_{PUMP1}$ and $C_{PUMP2}$. While switch devices $S_9$ and $S_{10}$ can comprise p-channel transistor devices, switch devices $S_9$ and $S_{10}$ can also comprise any other switch configuration. In addition, fewer or additional switch devices can be provided, based on the number of pump capacitors implemented within charge pump circuit 500.

Charging capacitor $C_{CHG}$ comprises a capacitor significantly larger than the largest parasitic capacitance. For example, charging capacitor $C_{CHG}$ can include a capacitance between approximately 2 to 40 times than that of the dominant parasitic capacitance, preferably from approximately 4 to 20 times larger. In accordance with an exemplary embodiment, charging capacitor $C_{CHG}$ comprises a 40 pF capacitor, as compared to an approximate 5 pF of dominant parasitic capacitances $C_{PAR1}$ and $C_{PAR3}$.

While independent charging circuit 506 comprises a pair of switch devices $S_9$ and $S_{10}$ configured for switching to charging capacitor $C_{CHG}$, independent charging circuit 506 could also be configured for switching to a voltage source for charging parasitic capacitances $C_{PAR1}$, $C_{PAR2}$, $C_{PAR3}$ and $C_{PAR4}$. For example, rather than charging capacitor $C_{CHG}$, a voltage follower could be suitably included within independent charging circuit 506 to charge parasitic capacitances $C_{PAR1}$, $C_{PAR2}$, $C_{PAR3}$ and $C_{PAR4}$. Moreover, any other device or circuit for providing a charge through switch devices $S_9$ and $S_{10}$ can be provided.

Figure 6:
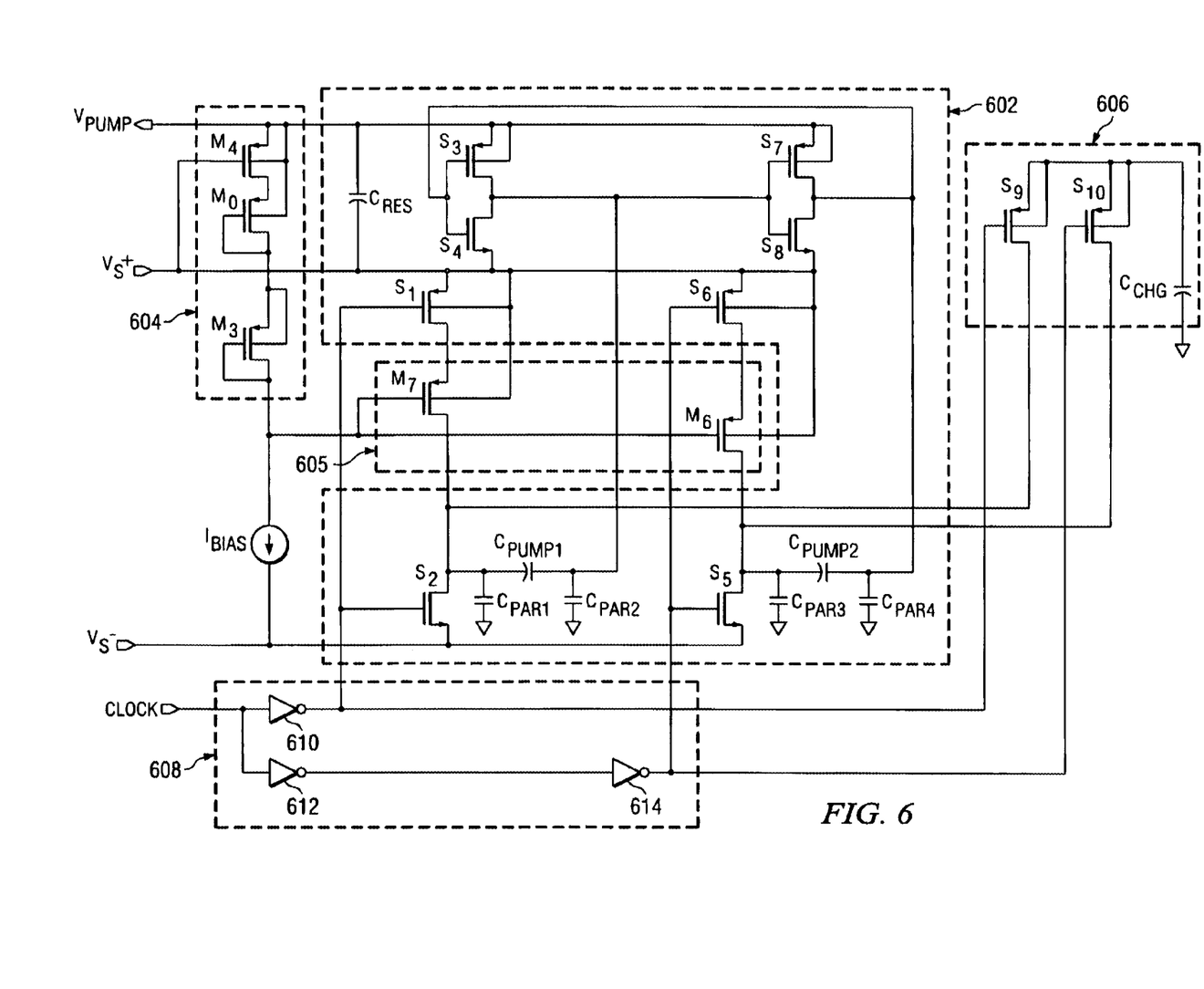
FIG. 6 illustrates a schematic diagram of an exemplary charge pump circuit with an independent charging circuit in accordance with another exemplary embodiment of the present invention.

With reference to FIG. 6, in accordance with another exemplary embodiment, a schematic diagram of an exemplary dual phase charge pump circuit 600 is illustrated. Charge pump circuit 600 comprises a dual phase charge pump doubler 602 configured with a regulation loop 604, an independent charging circuit 606, a clock circuit 608. In accordance with this exemplary embodiment, dual phase charge pump doubler 602 comprises four switches $S_5$, $S_6$, $S_7$ and $S_8$ and a second pump capacitor $C_{PUMP2}$ configured for supplying current during a first phase, four switches $S_1$, $S_2$, $S_3$ and $S_4$ and a first pump capacitor $C_{PUMP1}$ configured for supplying current during a second phase, and a reservoir capacitor $C_{RES}$ for maintaining a substantially constant output voltage at the load device. Upper switches $S_3$, $S_4$, $S_7$ and $S_8$ are suitably driven by a latch triggered drive. Pump capacitors $C_{PUMP1}$ and $C_{PUMP2}$ include parasitic capacitances $C_{PAR1}$ and $C_{PAR2}$ and parasitic capacitances $C_{PAR3}$ and $C_{PAR\ 4}$, respectively.

Regulation loop 604 comprises an amplifier 605 and a regulated voltage $V_{REG}$. Amplifier 605 is configured to provide regulation of the slower requirements for charging current within charge pump circuit 600. In accordance with this exemplary embodiment, amplifier 605 comprises transistor devices $M_6$ and $M_7$, and is configured for sensing differences in voltages $V_{PUMP}$ and $V_S^+$. However, amplifier 605 can comprise any amplifier configuration. Regulated voltage $V_{REG}$ is generated through transistors $M_0$, $M_3$ and $M_4$, and provides a voltage forced between pump voltage $V_{PUMP}$ and supply voltage $V_S^+$ during operation of regulation loop 604. A current source $I_{BIAS}$ is provided to generate regulated voltage $V_{REG}$, and can comprise any current source configuration.

Independent charging circuit 606 comprises a parasitic charging capacitor $C_{CHG}$ configured with a pair of switch devices $S_9$ and $S_{10}$ to facilitate charging of the parasitics during both discharging phases of operation of dual phase charge pump circuit 600. However, independent charging circuit 606 can comprise any other configuration for supplying a charging current to parasitic capacitances parasitic capacitances $C_{PAR1}$, $C_{PAR2}$, $C_{PAR3}$ and $C_{PAR4}$.

Clock circuit 608 is configured to provide clock signals to drive switch devices $S_1$, $S_2$, $S_5$, $S_6$ and switch devices $S_9$ and $S_{10}$ during both phases of operation. In the exemplary embodiment, clock circuit 608 comprises a plurality of inverter devices, e.g., inverters 610, 612 and 614, configured to provide dual phase logic signals. However, any logic configuration can be implemented.

The present invention has been described above with reference to an exemplary embodiment. However, those skilled in the art will recognize that changes and modifications may be made to the exemplary embodiment without departing from the scope of the present invention. For example, the various components may be implemented in alternate ways, such as, for example, the changing of transistor devices from PMOS to NMOS transistors and the changing of the polarity of the charge pump circuits. In addition, various of the transistor devices can be suitably configured as bipolar devices. These alternatives can be suitably selected depending upon the particular application or in consideration of any number of factors associated with the operation of the circuit. In addition, the techniques described herein may be extended or modified for use with other integrated circuits separate from a charge pump circuit. These and other changes or modifications are intended to be included within the scope of the present invention, as expressed in the following claims.

What is claimed is:

1. A charge pump circuit configured for minimizing voltage ripple, said charge pump circuit comprising:
   a charge pump comprising at least a first pump capacitor;
   a regulation loop configured for regulation of low speed inaccuracies of said charge pump circuit, said regulation loop coupled to said first pump capacitor; and
   an independent charging circuit configured for charging of parasitic capacitances associated with said first pomp capacitor during phase changes of said charge pump, wherein said independent charging circuit comprises a first switch device and a voltage source, said first switch device configured for providing a charge from said voltage source to said parasitic capacitances, and wherein said voltage source comprises a charging capacitor.

2. The charge pump circuit according to claim 1, wherein said charging capacitor has a capacitance between approximately 4 to 20 times the size of said parasitic capacitances.

3. The charge pump circuit according to claim 1, wherein said charge pump circuit comprises a dual phase charge pump doubler, said dual phase charge pump doubler further comprising a second pump capacitor, and said independent charging circuit further comprising a second switch device, said second switch device configured for providing a charge from said voltage source to said parasitic capacitances of said second charge pump capacitor.

4. A charge pump circuit configured for dual phase operation, said charge pump circuit comprising:
   an input supply voltage terminal;
   a pump voltage terminal;
   a dual phase charge pump doubler comprising a first charge pump capacitor and a second charge pump capacitor, and a plurality of switches;
   a regulation loop configured for regulation of low speed inaccuracies of said charge pump circuit, said regulation loop comprising an amplifier and a regulated voltage, said amplifier having a positive input terminal coupled to said input supply voltage terminal, and a negative input terminal coupled through said regulated voltage to said pump voltage terminal, and being configured to regulate internal nodes coupled to said first charge pump capacitor and said second charge pump capacitor; and
   an independent charging circuit comprising a voltage source configured for regulation of high speed inaccuracies caused by parasitic capacitances at said first charge pump capacitor and said second charge pump capacitor, said independent charging circuit configured for charging said parasitic capacitances during phase changes of said dual phase charge pump doubler.

5. The charge pump circuit according to claim 4, wherein said voltage source comprises a charging capacitor.

6. The charge pump circuit according to claim 4, wherein said independent charging circuit further comprises a first switch device and a second switch device, said first switch device configured to facilitate charging of parasitic capacitances associated with said first pump capacitor, and said second switch device configured to facilitate charging of parasitic capacitances associated with said second pump capacitor.

7. The charge pump circuit according to claim 6, wherein said charge pump circuit further comprises a clock circuit for controlling operation of said first switch device and said second switch device.

8. The charge pump circuit according to claim 7, wherein said independent charging circuit is configured to charge parasitic capacitances associated with said first pump capacitor during an initial phase within a discharging phase of said first pump capacitor.

9. The charge pump circuit according to claim 8, wherein said initial phase comprises between approximately 1% to 20% of said discharging phase.

10. The charge pump circuit according to claim 4, wherein said independent charging circuit is configured separate from any external source and any external bussing.

11. A method for minimizing voltage ripple in a dual phase charge pump circuit, said method comprising the steps of:

charging a first pump capacitor during a first charging phase;

charging parasitic capacitances associated with said first pump capacitor with an independent charging circuit during an initial phase of a first discharging phase of said first pump capacitor;

charging a second pump capacitor during a second charging phase; and charging parasitic capacitances associated with said second pump capacitor with said independent charging circuit during an initial phase of a second discharging phase of said second pump capacitor, wherein said steps of charging said parasitic capacitances minimizes utilization of a reservoir capacitor of said dual phase charge pump circuit to charge said parasitic capacitances.

12. The method according to claim 11, said step of charging parasitic capacitances associated with said first pump capacitor comprising the switching of charge from a voltage source of said independent charging circuit to said parasitic capacitances associated with said first pump capacitor.

13. The method according to claim 12, said step of charging parasitic capacitances associated with said second pump capacitor comprising the switching of charge from said voltage source of said independent charging circuit to said parasitic capacitances associated with said second pump capacitor.

14. The method according to claim 11, wherein said steps of charging said parasitic capacitances with said independent charging circuit occurs through local supply of a charge from a voltage source separate from any external bussing.

* * * * *

UNITED STATES PATENT AND TRADEMARK OFFICE
CERTIFICATE OF CORRECTION

PATENT NO.     : 6,794,923 B2
DATED          : September 21, 2004
INVENTOR(S)    : Rodney T. Burt et al.

It is certified that error appears in the above-identified patent and that said Letters Patent is hereby corrected as shown below:

Title page,
Item [75] Inventors, should read -- [75] Inventors: Rodney T. Burt, Tucson, AZ (US); Haoran Zhang, Tucson, AZ (US); Tomas L. Botker, Tucson, AZ (US); and Vadim V. Ivanov, Tucson, AZ (US) --

Signed and Sealed this

Tenth Day of May, 2005

JON W. DUDAS
*Director of the United States Patent and Trademark Office*